(12) United States Patent
Park et al.

(10) Patent No.: US 8,435,680 B2
(45) Date of Patent: May 7, 2013

(54) RECHARGEABLE LITHIUM BATTERY

(75) Inventors: Na-Rae Park, Yongin-si (KR); Jin-Sung Kim, Yongin-si (KR); Su-Hee Han, Yongin-si (KR); Jin-Hyunk Lim, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 389 days.

(21) Appl. No.: 12/825,620

(22) Filed: Jun. 29, 2010

(65) Prior Publication Data

US 2011/0081582 A1   Apr. 7, 2011

(30) Foreign Application Priority Data

Oct. 1, 2009   (KR) .................. 10-2009-0094113

(51) Int. Cl.
*H01M 6/18*   (2006.01)

(52) U.S. Cl.
USPC ........... 429/307; 429/330; 429/340; 429/199; 429/200; 429/231.1; 429/231.3; 429/231.5; 429/231.6

(58) Field of Classification Search ................. 429/307, 429/330, 340, 199, 200, 231.1, 231.3, 231.5, 429/231.6
See application file for complete search history.

(56) References Cited

U.S. PATENT DOCUMENTS

| 8,101,302 B2 * | 1/2012 | Lamanna et al. ............. 429/307 |
| 2004/0146786 A1 | 7/2004 | Sato et al. |
| 2008/0226977 A1 | 9/2008 | Kim et al. |
| 2011/0111305 A1 | 5/2011 | Jeon et al. |

FOREIGN PATENT DOCUMENTS

| JP | 11-339850 | 12/1999 |
| JP | 2003-086245 | 3/2003 |
| JP | 2005-100851 | 4/2005 |
| JP | 2006-294519 | 10/2006 |
| KR | 1020010040161 A | 5/2001 |
| KR | 10-2004-0005954 | 1/2004 |
| KR | 1020060049828 A | 5/2006 |
| KR | 100675047 B | 1/2007 |
| KR | 1020070031806 A | 3/2007 |
| KR | 10-2008-0083439 | 9/2008 |
| KR | 10-2009-0018003 | 2/2009 |

OTHER PUBLICATIONS

KIPO Notice of Allowance, dated May 17, 2011, for Korean priority Patent application 10-2009-0094113.
Patent Abstracts of Japan, and English machine translation of Japanese Publication 2006-294519, 42 pages.

* cited by examiner

*Primary Examiner* — Laura Weiner
(74) *Attorney, Agent, or Firm* — Christie, Parker & Hale, LLP

(57) ABSTRACT

A rechargeable lithium battery including: a positive electrode including a nickel-based positive active material; a negative electrode including a negative active material; and an electrolyte including a non-aqueous organic solvent, a lithium salt, a first fluoroethylene carbonate additive, a second vinylethylene carbonate additive, and a third alkane sultone additive, wherein when the battery is thicker than about 5mm, a mixing weight ratio of the first fluoroethylene carbonate additive to the second vinylethylene carbonate additive ranges from about 5:1 to about 10:1, or when the battery is thinner than about 5 mm, the mixing weight ratio of the first fluoroethylene carbonate additive to the second vinylethylene carbonate additive ranges from about 1:1 to about 4:1.

7 Claims, 1 Drawing Sheet

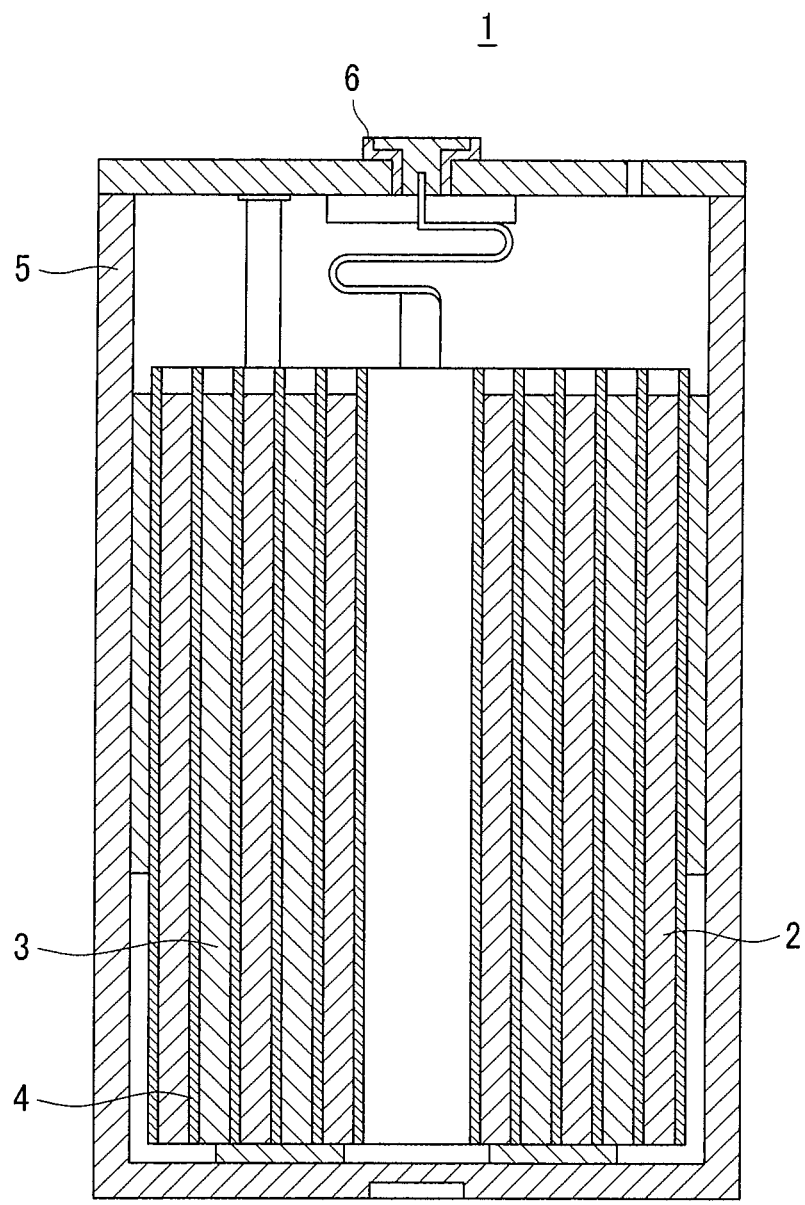

RECHARGEABLE LITHIUM BATTERY

CROSS-REFERENCE TO RELATED APPLICATION

This application claims priority to and the benefit of Korean Patent Application No. 10-2009-0094113, filed in the Korean Intellectual Property Office, on Oct. 1, 2009, the entire content of which is incorporated herein by reference.

BACKGROUND

1. Field

The following description relates generally to a rechargeable lithium battery.

2. Description of Related Art

Rechargeable lithium batteries have recently drawn attention as a power source for small portable electronic devices. They use an organic electrolyte solution and thereby may have twice the discharge voltage of a conventional battery using an alkali aqueous solution, and accordingly may have high energy density.

As for negative active materials of a rechargeable lithium battery, various carbon-based materials such as artificial graphite, natural graphite, and hard carbon, which all intercalate and deintercalate lithium ions, may be used. For positive active materials, composite metal oxides such as $LiCoO_2$, $LiMn_2O_4$, $LiNiO_2$, $LiNi_{1-x}Co_xO_2$ (0<x<1), $LiMnO_2$, and the like have been researched.

For an electrolyte solution, a lithium salt dissolved in a non-aqueous solvent of ethylene carbonate, dimethyl carbonate, diethyl carbonate, and the like may be used.

During the initial charge of a rechargeable lithium battery, lithium ions, which are released from the lithium-transition metal oxide, i.e., the positive electrode of the battery, are transferred to a carbon negative electrode where the ions are intercalated into the carbon. Because of its high reactivity, lithium reacts with the carbon negative electrode to produce $Li_2CO_3$, LiO, LiOH, etc., thereby forming a thin film on the surface of the negative electrode. This film is referred to as a solid electrolyte interface (SEI) film.

The organic SEI film formed during the initial charge may prevent or reduce the reaction between lithium ions and the carbon negative electrode or other materials during charging and discharging. The organic SEI film may also act as an ion tunnel, allowing the passage of lithium ions. The ion tunnel may prevent or reduce disintegration of the structure of the carbon negative electrode, which may be caused by co-intercalation of organic solvents having a high molecular weight along with solvated lithium ions into the carbon negative electrode.

Once formed, the organic SEI film may prevent or reduce further reaction of lithium ions with the carbon electrode or other materials, and thereby reversibly maintain the amount of lithium ions. That is, carbon of the negative electrode reacts with an electrolyte during the initial charging, thus forming a passivation layer such as an organic SEI film on the surface of the negative electrode such that the electrolyte solution no longer decomposes, and stable charging and discharging is maintained.

Because of these reasons, in the rechargeable lithium battery, there is no irreversible formation reaction of the passivation layer, and a stable cycle life after the initial charging reaction is maintained. However, gases are generated inside the battery due to decomposition of a carbonate-based organic solvent during the organic SEI film-forming reaction. These gases may include $H_2$, CO, $CO_2$, $CH_4$, $C_2H_6$, $C_3H_8$, $O_3H_6$, etc. depending on the type of non-aqueous organic solvent and negative active material used.

Due to the gases generated inside the battery, the battery may swell in a thickness direction when it is charged. When the battery is fully charged and kept at a high temperature (for example, 100% charged at 4.2V and allowed to stand at 85° C. for four days), the organic SEI film may gradually decompose based on the electrochemical energy and heat energy that increases as time passes, continuously causing a reaction with a new adjacent surface of the negative electrode when exposed with electrolyte solution.

The continuous generation of gases increases the internal pressure of the inside of the battery. There have been experiments for changing the organic SEI formation reaction by adding an additive to an electrolyte solution to suppress the internal pressure from increasing. However, when a particular chemical compound is added to an electrolyte solution to improve the battery performance, some aspects of the battery performance may be improved but some other aspects may be deteriorated.

For instance, when an additive is added to an electrolyte solution, the cycle life characteristic may be improved, but there may be a problem in that the thickness may be increased too much at a high temperature. To resolve the problem, fluoroethylene carbonate and/or vinylethylene carbonate have been used as additives to the solvent of an electrolyte solution.

However, this method does not resolve the swelling problem where the thickness of a battery is increased at a high temperature, when a nickel (Ni)-based positive active material, such as $LiNiO_2$, especially a positive active material with some Ni replaced with cobalt (Co) or manganese (Mn), is used. Recently, research has been performed to replace a Co-based positive active material, such as $LiCoO_2$, with the Ni-based positive active material.

SUMMARY

An aspect of an embodiment of the present invention is directed toward a rechargeable lithium battery having improved cycle life and swelling characteristics.

According to an embodiment, a rechargeable lithium battery is provided that includes a positive electrode including a nickel-based positive active material, a negative electrode including a negative active material, and a non-aqueous electrolyte including a non-aqueous organic solvent and a lithium salt. The non-aqueous electrolyte includes a first fluoroethylene carbonate additive, a second vinylethylene carbonate additive, and a third alkane sultone additive.

In an embodiment, when the battery has a thickness of more than about 5 mm, the mixing weight ratio of the first fluoroethylene carbonate additive to the second vinylethylene carbonate additive ranges from about 5:1 to about 10:1. In another embodiment, when the battery has a thickness of less than about 5 mm, the mixing weight ratio of the first fluoroethylene carbonate additive to the second vinylethylene carbonate additive ranges from about 1:1 to about 4:1.

In an embodiment, the alkane sultone includes one or more of, but not limited to propane sultone, butane sultone, pentane sultone, hexane sultone, and mixtures thereof.

Hereinafter, further embodiments of this disclosure will be described in more detail.

The rechargeable lithium battery of one embodiment of this disclosure may have improved swelling characteristic and/or cycle life characteristic.

BRIEF DESCRIPTION OF THE DRAWINGS

The accompanying drawings, together with the specification, illustrate exemplary embodiments of the present inven- FIG. 1 is a schematic view of a rechargeable lithium battery according to an embodiment.

DETAILED DESCRIPTION

In the following detailed description, only certain exemplary embodiments of the present invention are shown and described, by way of illustration. As those skilled in the art would recognize, the invention may be embodied in many different forms and should not be construed as being limited to the embodiments set forth herein.

The rechargeable lithium battery according to one embodiment includes a positive electrode including a nickel-based positive active material, a negative electrode including a negative active material, and a non-aqueous electrolyte including a non-aqueous organic solvent and a lithium salt. The rechargeable lithium battery of the present embodiment may be a prismatic battery.

In this embodiment, a particular additive is added to the non-aqueous electrolyte with its composition controlled so as to improve the swelling and cycle life characteristics of a battery using a nickel (Ni)-based positive active material.

The non-aqueous electrolyte includes an additive including a first fluoroethylene carbonate additive, a second vinylethylene carbonate additive, and a third alkane sultone additive. When the additive does not include all three additives but includes one or two of the additives, the swelling characteristic at a high temperature and cycle life characteristic may not be improved.

The mixing ratio of the fluoroethylene carbonate additive to vinylethylene carbonate additive may be varied according to the thickness of the battery. For example, in one embodiment, when the battery thickness is greater than about 5 mm, the mixing weight ratio of the fluoroethylene carbonate additive to vinylethylene carbonate additive may range from about 5:1 to about 10:1, or the mixing weight ratio of the fluoroethylene carbonate additive to vinylethylene carbonate additive may range from about 6:1 to about 7:1.

In another embodiment, when the battery thickness is less than about 5 mm, the mixing weight ratio of the fluoroethylene carbonate additive to vinylethylene carbonate additive may range from about 1:1 to about 4:1, or the mixing weight ratio may range from about 3:1 to about 4:1.

The alkane sultone may be a C3-C6 alkane sultone (e.g. a C3, C4, C5 and/or C6 alkane sultone), and for example may be one or more of, but not limited to propane sultone, butane sultone, pentane sultone, hexane sultone, and mixtures thereof. Especially, the alkane sultone may be propane sultone, butane sultone, or mixtures thereof.

The dimensions of a battery are usually written in the order of thickness-width-length in the case of a prismatic battery. The term "the thickness of a battery" is used in this specification. For example, when the dimensions of a battery are 503442, the thickness of the battery is 5.0 mm.

In one embodiment, a battery having a thickness equal to or thicker than about 5 mm refers to a prismatic battery 503442 (where the thickness is 5.0 mm) or a prismatic battery 553450 (where the thickness is 5.5 mm); and the current density ($A/cm^2$) of the battery ranges from about 3.15 to about 3.25, and the volume capacity of the battery ranges from about 590 to about 600 mAh. A battery with a thickness thinner than about 5 mm is a prismatic battery 463446 having a thickness of about 4.6 mm or a prismatic battery 463450 having a thickness of about 4.6 mm; and the current density ($A/cm^2$) of the battery ranges from about 3.30 to about 3.50, and the volume capacity of the battery ranges from about 530 to 540 mAh.

The electrolyte of one embodiment may be prepared by adding a first fluoroethylene carbonate additive, a second vinylethylene carbonate additive, and a third alkane sultone additive to a typical electrolyte solution, which includes a non-aqueous organic solvent and a lithium salt. Herein, the amount of the fluoroethylene carbonate added thereto may range from about 0.1 to about 10 parts by weight based on 100 parts by weight of the non-aqueous organic solvent. The amount of the vinylethylene carbonate added thereto may range from about 0.1 to about 10 parts by weight based on 100 parts by weight of the non-aqueous organic solvent. The amount of the alkane sultone added thereto may range from about 0.1 to about 5 parts by weight based on 100 parts by weight of the non-aqueous organic solvent. Accordingly, the content of the fluoroethylene carbonate, vinylethylene carbonate, and alkane sultone existing in the final electrolyte may range from about 0.1 to about 10 parts by weight, from about 0.1 to about 10 parts by weight, and from about 0.1 to about 5 parts by weight, respectively, within an error range based on 100 parts by weight of the non-aqueous organic solvent.

In a non-aqueous electrolyte according to one embodiment, a non-aqueous organic solvent functions as a medium for transmitting ions taking part in the electrochemical reaction of a battery. The non-aqueous organic solvent may include a carbonate-based solvent, an ester-based solvent, an ether-based solvent, a ketone-based solvent, an alcohol-based solvent, and/or an aprotic solvent. Examples of the carbonate-based solvent may include dimethyl carbonate (DMC), diethyl carbonate (DEC), dipropyl carbonate (DPC), methylpropyl carbonate (MPC), ethylpropyl carbonate (EPC), methylethyl carbonate (MEC), ethylene carbonate (EC), propylene carbonate (PC), butylene carbonate (BC), and the like. Examples of the ester-based solvent may include methyl acetate, ethyl acetate, n-propyl acetate, dimethylacetate, methylpropionate, ethylpropionate, γ-butyrolactone, decanolide, valerolactone, mevalonolactone, caprolactone, and the like. Examples of the ether-based solvent include dibutyl ether, tetraglyme, diglyme, dimethoxyethane, 2-methyltetrahydrofuran, tetrahydrofuran, and so on, and examples of the ketone-based solvent include cyclohexanone and the like. Examples of the alcohol-based solvent include ethyl alcohol, isopropyl alcohol, and so on, and examples of the aprotic solvent include nitriles such as R—CN (wherein R is a C2 to C20 linear, branched, or cyclic hydrocarbon, a double bond, an aromatic ring, or an ether bond), amides such as dimethylformamide, dioxolanes such as 1,3-dioxolane, sulfolanes, and the like.

The non-aqueous organic solvent may be used singularly or as a mixture. When the organic solvent is used as a mixture, the mixture ratio may be controlled in accordance with desirable battery performance.

The carbonate-based solvent may include a mixture of a cyclic carbonate and a linear carbonate. In one embodiment of the electrolyte, the cyclic carbonate and the chain carbonate are mixed together in a volume ratio of about 1:1 to about 1:9, and when the mixture is used as an electrolyte, the electrolyte performance may be enhanced.

In addition, the electrolyte of one embodiment may further include mixtures of carbonate-based solvents and aromatic hydrocarbon-based solvents. In one embodiment, the carbonate-based solvents and the aromatic hydrocarbon-based solvents are mixed together in a volume ratio of about 1:1 to about 30:1.

The aromatic hydrocarbon-based organic solvent may be represented by the following Chemical Formula 2.

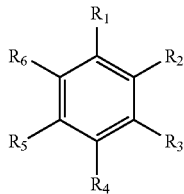

Chemical Formula 2

In the above Chemical Formula 2, $R_1$ to $R_6$ may be independently a hydrogen, a halogen, a C1 to C10 alkyl, a C1 to C10 haloalkyl, or combinations thereof.

The aromatic hydrocarbon-based organic solvent may include one or more of, but not limited to benzene, fluorobenzene, 1,2-difluorobenzene, 1,3-difluorobenzene, 1,4-difluorobenzene, 1,2,3-trifluorobenzene, 1,2,4-trifluorobenzene, chlorobenzene, 1,2-dichlorobenzene, 1,3-dichlorobenzene, 1,4-dichlorobenzene, 1,2,3-trichlorobenzene, 1,2,4-trichlorobenzene, iodobenzene, 1,2-diiodobenzene, 1,3-diiodobenzene, 1,4-diiodobenzene, 1,2,3-triiodobenzene, 1,2,4-triiodobenzene, toluene, fluorotoluene, 1,2-difluorotoluene, 1,3-difluorotoluene, 1,4-difluorotoluene, 1,2,3-trifluorotoluene, 1,2,4-trifluorotoluene, chlorotoluene, 1,2-dichlorotoluene, 1,3-dichlorotoluene, 1,4-dichlorotoluene, 1,2,3-trichlorotoluene, 1,2,4-trichlorotoluene, iodotoluene, 1,2-diiodotoluene, 1,3-diiodotoluene, 1,4-diiodotoluene, 1,2,3-triiodotoluene, 1,2,4-triiodotoluene, xylene, and combinations thereof.

The lithium salt supplies lithium ions in the battery, performs a basic operation of a rechargeable lithium battery, and improves lithium ion transport between positive and negative electrodes. Examples of the lithium supporting salt include one or more of, but not limited to $LiPF_6$, $LiBF_4$, $LiSbF_6$, $LiAsF_6$, $LiN(SO_2C_2F_6)_2$, $Li(CF_3SO_2)_2N$, $LiN(SO_3C_2F_6)_2$, $LiC_4F_9SO_3$, $LiClO_4$, $LiAlO_2$, $LiAlCl_4$, $LiN(C_xF_{2x+1}SO_2)(C_yF_{2y+1}SO_2)$, (where x and y are natural numbers), LiCl, LiI, $LiB(C_2O_4)_2$ (lithium bisoxalate borate, LiBOB), and combinations thereof. The lithium salt may be used at a concentration ranging from about 0.1 to about 2.0M. When the lithium salt is included at the above concentration range, electrolyte performance and lithium ion mobility may be enhanced due to enhanced electrolyte conductivity and viscosity.

As described above, when a non-aqueous electrolyte containing fluoroethylene carbonate, vinylethylene carbonate, and alkane sultone are used as additives in the above-mentioned composition ratio it may improve the swelling and cycle life characteristics when a nickel-based positive active material, particularly a chemical compound represented by the following Formula 1, is used as the positive active material. Since cobalt (Co)-based positive active materials such as $LiCoO_2$ are not as prone to swelling, adding alkane sultone may not be beneficial.

Chemical Formula 1 wherein, M is $M'_{1-k}A_k$ (M' is $Ni_{1-a-b}Mn_aCo_b$, $0.65 \leq a+b \leq 0.85$, $0.1 \leq b \leq 0.4$, A is a dopant, for example an element selected from the group consisting of B, Ca, Zr, S, F, P, Bi, Al, Mg, Zn, Sr, Cu, Fe, Ga, In, Cr, Ge, and Sn, and $0 \leq k < 0.05$); L is selected from the group consisting of F, S, P, and combinations thereof,
$0.95 \leq x \leq 1.05$, and
$0 \leq z \leq 2$.

A positive electrode according to one embodiment includes a conductive material and a binder along with the positive active material.

The binder improves binding properties of the positive active material particles to each other and to a current collector. Examples of the binder include one or more of, but not limited to polyvinyl alcohol, carboxylmethyl cellulose, hydroxypropyl cellulose, diacetyl cellulose, polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, a styrene-butadiene rubber, an acrylated styrene-butadiene rubber, an epoxy resin, nylon, and combinations thereof.

The conductive material may be included to improve electrode conductivity. Any electrically conductive material may be used as a conductive material unless it causes a chemical change. Examples of the conductive material include one or more of, but not limited to natural graphite, artificial graphite, carbon black, acetylene black, ketjen black, carbon fiber, a metal powder or a metal fiber including copper, nickel, aluminum, silver, and so on, a polyphenylene derivative, and mixtures thereof.

The positive electrode may be fabricated by a method including mixing the positive active material, a conductive material, and a binder to provide a positive active material composition, and coating the composition on a current collector. The solvent may be N-methylpyrrolidone, but it is not limited thereto. The current collector may be made of Al, but is not limited thereto.

The negative electrode includes a current collector and a negative active material layer disposed thereon, and the negative active material layer includes a negative active material.

The negative active material includes a material that reversibly intercalates/deintercalates lithium ions, a lithium metal, a lithium metal alloy, a material being capable of doping lithium, and/or a transition metal oxide.

The material that reversibly intercalates/deintercalates lithium ions includes carbon materials. The carbon materials may be any suitable carbon-based negative active material for a lithium ion rechargeable battery. Examples of the carbon material include one or more of, but not limited to crystalline carbon, amorphous carbon, and mixtures thereof. The crystalline carbon may be non-shaped, or sheet, flake, spherical, or fiber shaped natural graphite or artificial graphite. The amorphous carbon may be a soft carbon (carbon obtained by sintering at a low temperature), a hard carbon (carbon obtained by sintering at a high temperature), mesophase pitch carbide, fired coke, and so on.

Examples of the lithium metal alloy include, but are not limited to, lithium and a metal selected from the group consisting of Na, K, Rb, Cs, Fr, Be, Mg, Ca, Sr, Si, Sb, Pb, In, Zn, Ba, Ra, Ge, Al, Sn, and combinations thereof.

Examples of the material being capable of doping lithium include, but are not limited to, Si, $SiO_x$ ($0<x<2$), a Si-Q1 alloy (where Q1 is an element selected from the group consisting of an alkali metal, an alkaline-earth metal, a group 13 element, a group 14 element, a transition element, a rare earth element, and combinations thereof, and is not Si), Sn, $SnO_2$, a Sn-Q2 alloy (where Q2 is an element selected from the group consisting of an alkali metal, an alkaline-earth metal, a group 13 element, a group 14 element, a transition element, a rare earth element, and combinations thereof, and is not Sn), and mixtures thereof. At least one of these materials may be mixed with $SiO_2$. The elements Q1 and Q2 may be the same or different, and may be independently selected from the group consisting of Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Ti, Ge, P, As, Sb, Bi, S, Se, Te, Po, and combinations thereof.

Examples of the transition metal oxide include vanadium oxide, lithium vanadium oxide, and the like.

The negative active material layer includes a binder, and optionally a conductive material.

The binder may improve the binding properties of the negative active material particles to each other and to a current collector. Examples of the binder include one or more of, but not limited to polyvinyl alcohol, carboxylmethyl cellulose, hydroxypropyl cellulose, polyvinyl chloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, a styrene-butadiene rubber, an acrylated styrene-butadiene rubber, an epoxy resin, nylon, and the like.

The conductive material is included to improve electrode conductivity. Any suitable electrically conductive material may be used as a conductive material unless it causes a chemical change. Examples of the conductive material include one or more of, but not limited to natural graphite, artificial graphite, carbon black, acetylene black, ketjen black, a carbon fiber, a metal powder or a metal fiber including copper, nickel, aluminum, silver, and so on, a polyphenylene derivative, and mixtures thereof.

The current collector may be one or more of, but not limited to a copper foil, a nickel foil, a stainless steel foil, a titanium foil, a nickel foam, a copper foam, a polymer substrate coated with a conductive metal, and combinations thereof.

The negative electrode may be fabricated by a method including mixing the negative active material, a conductive material, and a binder to provide an active material composition, and coating the composition on a current collector. The solvent may be N-methylpyrrolidone, but it is not limited thereto.

The rechargeable lithium battery may further include a separator between a negative electrode and a positive electrode, as needed. Non-limiting examples of suitable separator materials include polyethylene, polypropylene, polyvinylidene fluoride, and multi-layers thereof such as a polyethylene/polypropylene double-layered separator, a polyethylene/polypropylene/polyethylene triple-layered separator, and a polypropylene/polyethylene/polypropylene triple-layered separator.

Rechargeable lithium batteries may be classified as lithium ion batteries, lithium ion polymer batteries, and lithium polymer batteries according to the presence of a separator and the kind of electrolyte used in the battery. Suitable structures and fabricating methods for lithium ion batteries are utilized.

FIG. 1 is a schematic view of a representative structure of a rechargeable lithium battery according to one embodiment. As shown in FIG. 1, the rechargeable lithium battery 1 includes a positive electrode 3, a negative electrode 2, a separator 4 interposed between the positive electrode 3 and the negative electrode 2, an electrolyte impregnating the separator 4, a battery case 5, and a sealing member 6 sealing the battery case 5.

The following examples illustrate embodiments of the present invention in more detail. These examples, however, should not in any sense be interpreted as limiting the scope of the present invention.

1. Battery Thinner than about 5 mm

COMPARATIVE EXAMPLE 1

A positive active material slurry is prepared by mixing a $LiCoO_2$ positive active material, a polyvinylidene fluoride binder, and a carbon black conductive material in a ratio of about 94:3:3 wt % in an N-methylpyrrolidone solvent. A positive electrode is formed by coating an Al-foil current collector with the positive active material slurry through a conventional electrode manufacturing process.

A negative active material slurry is prepared by mixing an artificial graphite negative active material, a polyvinylidene fluoride binder, and a carbon black conductive material in a ratio of about 94:3:3 wt % in an N-methylpyrrolidone solvent. A negative electrode is formed by coating a Cu-foil current collector with the negative active material slurry through a conventional electrode manufacturing process.

A rechargeable lithium battery cell having a thickness of about 4.6 mm and a capacity of about 800 mAh is fabricated with the positive electrode, the negative electrode, a non-aqueous electrolyte, and a polyethylene separator through a suitable process. As for the non-aqueous electrolyte, a mixed solution of ethylene carbonate, ethylmethyl carbonate, and vinylethylene carbonate (1:1:1 volume ratio) with about 1.15M of $LiPF_6$ dissolved therein is used.

COMPARATIVE EXAMPLE 2

A rechargeable lithium battery cell is fabricated by the same process as Comparative Example 1, except that a mixed solution of ethylene carbonate, ethylmethyl carbonate, and vinylethylene carbonate (about 1:1:1 volume ratio) with about 1.15M of $LiPF_6$ dissolved therein and fluoroethylene carbonate and vinylethylene carbonate added thereto is used as a non-aqueous electrolyte. Herein, the content of the fluoroethylene carbonate is about 3 parts by weight based on 100 parts by weight of the non-aqueous organic solvent of the ethylene carbonate, ethylmethyl carbonate, and vinylethylene carbonate, and the content of the vinylethylene carbonate is 1 part by weight. Also, the mixing weight ratio of fluoroethylene carbonate to vinylethylene carbonate is about 3:1.

COMPARATIVE EXAMPLE 3

A rechargeable lithium battery cell is fabricated according to the same process as Comparative Example 1, except that a $LiNi_{0.5}Mn_{0.2}Co_{0.3}O_2$ positive active material is used as a positive active material.

COMPARATIVE EXAMPLE 4

A rechargeable lithium battery is fabricated by the same process as Comparative Example 3, except that a mixed solution of ethylene carbonate, ethylmethyl carbonate, and vinylethylene carbonate (about 1:1:1 volume ratio) with about 1.15M of $LiPF_6$ dissolved therein and fluoroethylene carbonate and vinylethylene carbonate added thereto is used as a non-aqueous electrolyte. Herein, the content of the fluoroethylene carbonate is about 3 parts by weight based on 100 parts by weight of the non-aqueous organic solvent of the ethylene carbonate, ethylmethyl carbonate, and vinylethylene carbonate, and the content of the vinylethylene carbonate is about 1 part by weight. Also, the mixing weight ratio of fluoroethylene carbonate to vinylethylene carbonate is about 3:1.

COMPARATIVE EXAMPLE 5

A rechargeable lithium battery is fabricated by the same process as Comparative Example 3, except that a mixed solution of ethylene carbonate, ethylmethyl carbonate, and vinylethylene carbonate (about 1:1:1 volume ratio) with about 1.15M of $LiPF_6$ dissolved therein and propane sultone added thereto is used as a non-aqueous electrolyte. Herein, the content of the propane sultone is about 2 parts by weight based on 100 parts by weight of the non-aqueous organic solvent of the ethylene carbonate, ethylmethyl carbonate, and vinylethylene carbonate.

EXAMPLE 1

A rechargeable lithium battery is fabricated by the same process as Comparative Example 1, except that a mixed solution of ethylene carbonate, ethylmethyl carbonate, and vinylethylene carbonate (about 1:1:1 volume ratio) with about 1.15M of $LiPF_6$ dissolved therein and fluoroethylene carbonate, vinylethylene carbonate, and propane sultone added thereto is used as a non-aqueous electrolyte. Herein, the content of the fluoroethylene carbonate is about 3 parts by weight based on 100 parts by weight of the non-aqueous organic solvent of the ethylene carbonate, ethylmethyl carbonate, and vinylethylene carbonate, and the content of the vinylethylene carbonate is about 1 part by weight while the content of the propane sultone is 1 part by weight. Also, the mixing weight ratio of fluoroethylene carbonate to vinylethylene carbonate is about 3:1.

EXAMPLE 2

A rechargeable lithium battery is fabricated by the same process as Example 1, except that the content of the propane sultone is changed to about 2 parts by weight based on 100 parts by weight of the non-aqueous organic solvent of ethylene carbonate, ethylmethyl carbonate, and vinylethylene carbonate.

EXAMPLE 3

A rechargeable lithium battery is fabricated by the same process as Example 1, except that the content of the propane sultone is changed to about 4 parts by weight based on 100 parts by weight of the non-aqueous organic solvent of ethylene carbonate, ethylmethyl carbonate, and vinylethylene carbonate.

EXAMPLE 4

A rechargeable lithium battery is fabricated by the same process as Example 1, except that the content of the propane sultone is changed to about 5 parts by weight based on 100 parts by weight of the non-aqueous organic solvent of ethylene carbonate, ethylmethyl carbonate, and vinylethylene carbonate.

EXAMPLE 5

A rechargeable lithium battery is fabricated by the same process as Example 1, except that butane sultone is used instead of propane sultone and the content of the butane sultone is about 2 parts by weight based on 100 parts by weight of the non-aqueous organic solvent of ethylene carbonate, ethylmethyl carbonate, and vinylethylene carbonate.

EXAMPLE 6

A rechargeable lithium battery is fabricated by the same process as Example 2, except that the content of the vinylethylene carbonate is changed to about 3 parts by weight based on 100 parts by weight of the non-aqueous organic solvent of ethylene carbonate, ethylmethyl carbonate, and vinylethylene carbonate, and a non-aqueous electrolyte containing fluoroethylene carbonate and vinylethylene carbonate in a mixing weight ratio of about 3:3 is used.

COMPARATIVE EXAMPLE 6

A rechargeable lithium battery is fabricated by the same process as Example 2, except that the content of the fluoroethylene carbonate is changed to about 6 parts by weight based on 100 parts by weight of the non-aqueous organic solvent of ethylene carbonate, ethylmethyl carbonate, and vinylethylene carbonate, and a non-aqueous electrolyte containing fluoroethylene carbonate and vinylethylene carbonate in a mixing weight ratio of about 6:1 is used.

COMPARATIVE EXAMPLE 7

A rechargeable lithium battery is fabricated by the same process as Example 2, except that the content of the fluoroethylene carbonate is changed to about 9 parts by weight based on 100 parts by weight of the non-aqueous organic solvent of ethylene carbonate, ethylmethyl carbonate, and vinylethylene carbonate, and a non-aqueous electrolyte containing fluoroethylene carbonate and vinylethylene carbonate in a mixing weight ratio of about 9:1 is used.

COMPARATIVE EXAMPLE 8

A rechargeable lithium battery is fabricated by the same process as Example 2, except that the content of the fluoroethylene carbonate is changed to about 10 parts by weight based on 100 parts by weight of the non-aqueous organic solvent of ethylene carbonate, ethylmethyl carbonate, and vinylethylene carbonate, and a non-aqueous electrolyte containing fluoroethylene carbonate and vinylethylene carbonate in a mixing weight ratio of about 10:1 is used.

COMPARATIVE EXAMPLE 9

A rechargeable lithium battery is fabricated by the same process as Example 2, except that the content of the fluoroethylene carbonate is changed to about 11 parts by weight based on 100 parts by weight of the non-aqueous organic solvent of ethylene carbonate, ethylmethyl carbonate, and vinylethylene carbonate, and a non-aqueous electrolyte containing fluoroethylene carbonate and vinylethylene carbonate in a mixing weight ratio of about 11:1 is used.

COMPARATIVE EXAMPLE 10

A rechargeable lithium battery is fabricated by the same process as Example 2, except that the content of the vinylethylene carbonate is changed to about 4 parts by weight based on 100 parts by weight of the non-aqueous organic solvent of ethylene carbonate, ethylmethyl carbonate, and vinylethylene carbonate, and a non-aqueous electrolyte containing fluoroethylene carbonate and vinylethylene carbonate in a mixing weight ratio of about 3:4 is used.

COMPARATIVE EXAMPLE 11

A rechargeable lithium battery is fabricated by the same process as Example 2, except that the content of the vinylethylene carbonate is changed to about 6 parts by weight based on 100 parts by weight of the non-aqueous organic solvent of ethylene carbonate, ethylmethyl carbonate, and vinylethylene carbonate, and a non-aqueous electrolyte containing fluoroethylene carbonate and vinylethylene carbonate in a mixing weight ratio of about 1:2 is used.

COMPARATIVE EXAMPLE 12

A rechargeable lithium battery is fabricated by the same process as Example 2, except that vinylethylene carbonate is not used, and a non-aqueous electrolyte containing fluoroethylene carbonate in a content of about 3 parts by weight based on 100 parts by weight of the non-aqueous organic solvent of ethylene carbonate, ethylmethyl carbonate, and vinylethylene carbonate is used.

COMPARATIVE EXAMPLE 13

A rechargeable lithium battery is fabricated by the same process as Example 2, except that fluoroethylene carbonate is not used and a non-aqueous electrolyte containing vinylethylene carbonate in a content of about 1 part by weight based on 100 parts by weight of the non-aqueous organic solvent of ethylene carbonate, ethylmethyl carbonate, and vinylethylene carbonate is used.

The physical properties of rechargeable lithium battery cells fabricated according to Examples 1 to 6 and Comparative Examples 1 to 13 were measured, and the measurement results are presented in the following Table 1.

1) Thickness Expansion Rate (when Allowed to Stand at about 85° C. for about 5 Hours)

The initial thicknesses of the rechargeable lithium battery cells were measured after the rechargeable lithium battery cells were formation-charged and then standard-charged at about 1 C to about 4.2V. Subsequently, the rechargeable lithium battery cells were allowed to stand in a chamber at about 85° C. for about 5 hours and their thicknesses were measured. The thickness expansion rates of the rechargeable lithium battery cells are acquired based on the following Equation 1.

Thickness Expansion Rate (%)=((thickness after allowed to stand−initial thickness)/initial thickness)*100   Equation 1

2) Low Temperature Discharge Characteristic (−20° C.)

The rechargeable lithium battery cells were formation-charged and then standard-charged at about 1 C to about 4.2V. Subsequently, the rechargeable lithium battery cells were allowed to stand at about −20° C. for about 3 hours and then discharged at about 0.5 C to about 3.2V, and their discharge efficiencies were measured.

3) Cycle Life Characteristic

Rechargeable lithium battery cells were charged and discharged about 300 times under the conditions of about 800 mA/4.2V, about 400 mA cut-off charge at room temperature, and about 800 mA/3.2V constant current-constant voltage discharge. Their discharge capacities after performing the charge and discharge about 300 times were measured, and their capacity retentions (cycle life characteristic) was acquired based on the following Equation 2.

Capacity Retention (%)=(discharge capacity at $300^{th}$ discharge/discharge capacity at $1^{st}$ discharge)*100   Equation 2

In the following Table 1, "FEC3+VEC1" represents that the mixing weight ratio of FEC to VEC was about 3:1, and PS2 represents that the content of PS was about 2 parts by weight based on 100 parts by weight of a non-aqueous organic solvent.

TABLE 1

| | Positive active material | First additive + second additive | Third additive | Thickness expansion ratio (%) | Low temperature discharge characteristic (%) | Cycle life (%) |
|---|---|---|---|---|---|---|
| Comparative Example 1 | LCO | — | — | 17 | — | 72 |
| Comparative Example 2 | LCO | FEC3 + VEC1 | — | 12 | — | 93 |
| Comparative Example 3 | NCM | — | — | 21 | 4 | 68 |
| Comparative Example 4 | NCM | FEC3 + VEC1 | — | 17 | 18 | 86 |
| Comparative Example 5 | NCM | — | PS2 | 20 | — | 78 |
| Example 1 | NCM | FEC3 + VEC1 | PS1 | 12 | 22 | 92 |
| Example 2 | NCM | FEC3 + VEC1 | PS2 | 11 | 22 | 92 |
| Example 3 | NCM | FEC3 + VEC1 | PS4 | 11 | 25 | 94 |
| Example 4 | NCM | FEC3 + VEC1 | PS5 | 13 | 26 | 94 |
| Example 5 | NCM | FEC3 + VEC1 | BS2 | 12 | 20 | 90 |
| Example 6 | NCM | FEC3 + VEC3 | PS2 | 10 | 18 | 90 |
| Comparative Example 6 | NCM | FEC6 + VEC1 | PS2 | 12 | 15 | 88 |
| Comparative Example 7 | NCM | FEC9 + VEC1 | PS2 | 13 | 12 | 83 |
| Comparative Example 8 | NCM | FEC10 + VEC1 | PS2 | 15 | 8 | 80 |
| Comparative Example 9 | NCM | FEC11 + VEC1 | PS2 | 17 | 6 | 77 |
| Comparative Example 10 | NCM | FEC3 + VEC4 | PS2 | 9 | 15 | 88 |
| Comparative Example 11 | NCM | FEC3 + VEC6 | PS2 | 10 | 10 | 85 |
| Comparative Example 12 | NCM | FEC3 | PS2 | 19 | 12 | 82 |

TABLE 1-continued

| | Positive active material | First additive + second additive | Third additive | Thickness expansion ratio (%) | Low temperature discharge characteristic (%) | Cycle life (%) |
|---|---|---|---|---|---|---|
| Comparative Example 13 | NCM | VEC1 | PS2 | 16 | 15 | 50 |

LCO: LiCoO$_2$
NCM: LiNi$_{0.5}$Mn$_{0.2}$Co$_{0.3}$O$_2$ positive electrode active material
FEC: fluoroethylene carbonate
VEC: vinylethylene carbonate
PS: propane sultone
BS: butane sultone As shown in Table 1, the thickness expansion ratios of the rechargeable lithium battery cells fabricated according to Examples 1 to 6 are as low as about 11 to about 13%. Also, the low temperature discharge characteristic ranges from about 20 to about 26%, which is excellent (or favorable). Moreover, the cycle life characteristic ranging from about 90 to about 94% is excellent (or favorable) as well.

Comparison of the rechargeable lithium battery cells fabricated according to Comparative Examples 1 and 2, having LiCoO$_2$ as a positive active material, shows that the addition of fluoroethylene carbonate and vinylethylene carbonate to the electrolyte may improve the cycle life characteristic and decrease the thickness expansion ratio, even without the addition of alkane sultone to the electrolyte.

However, the rechargeable lithium battery cells of the comparative examples using LiNi$_{0.5}$Mn$_{0.2}$CO$_{0.3}$O$_2$ as a positive active material have different physical properties according to the use of an additive, which will be described in more detail.

In the case of the rechargeable lithium battery cell fabricated according to Comparative Example 3 not using the additives of fluoroethylene carbonate and vinylethylene carbonate, the low temperature discharge characteristic and the cycle life characteristic were deteriorated. In the case of the rechargeable lithium battery cells fabricated according to Comparative Examples 4 and 5 using fluoroethylene carbonate and vinylethylene carbonate without alkane sultone and using alkane sultone without fluoroethylene carbonate and vinylethylene carbonate, respectively, the low temperature discharge characteristic and the cycle life characteristic were improved more than that of Comparative Example 3, but the improvement did not reach satisfactory levels. Generally, the low temperature discharge characteristic should be higher than about 20%, and the cycle life characteristic should be higher than about 85%.

Also, in the case of the rechargeable lithium battery cells fabricated according to Comparative Examples 6 to 11 with a mixing ratio of fluoroethylene carbonate and vinylethylene carbonate ranging from about 1:2 to about 11:1, the low temperature discharge characteristic was deteriorated, and in some cases, the cycle life characteristic was deteriorated as well.

Also, in the case of the rechargeable lithium battery cell fabricated according to Comparative Example 12 using fluoroethylene carbonate and alkane sultone and the rechargeable lithium battery cell fabricated according to Comparative Example 13 using vinylethylene carbonate and alkane sultone, the thickness expansion ratios were high while the low temperature discharge characteristic and the cycle life characteristic were deteriorated.

It may be seen from the results of Table 1 that a satisfactory thickness expansion ratio, low temperature discharge characteristic, and cycle life characteristic may be obtained by adding the fluoroethylene carbonate, vinylethylene carbonate, and alkane sultone additives to the non-aqueous electrolyte, and by varying the mixing ratio in accordance with the cell thickness.

2. Battery Thicker than about 5 mm

COMPARATIVE EXAMPLE 14

A positive active material slurry is prepared by mixing a LiCoO$_2$ positive active material, a polyvinylidene fluoride binder, and a carbon black conductive material in a ratio of about 94:3:3 wt % in an N-methylpyrrolidone solvent. A positive electrode is formed by coating an Al-foil current collector with the positive active material slurry through a conventional electrode manufacturing process.

A negative active material slurry is prepared by mixing an artificial graphite negative active material, a polyvinylidene fluoride binder, and a carbon black conductive material in a ratio of about 94:3:3 wt % in an N-methylpyrrolidone solvent. A negative electrode is formed by coating a Cu-foil current collector with the negative active material slurry through a conventional electrode manufacturing process.

A rechargeable lithium battery cell having a thickness of about 5.0 mm and a capacity of about 800 mAh is fabricated with the positive electrode, the negative electrode, a non-aqueous electrolyte, and a polyethylene separator through a conventional process. As for the non-aqueous electrolyte, a mixed solution of ethylene carbonate, ethylmethyl carbonate, and vinylethylene carbonate (about a 1:1:1 volume ratio) with about 1.15M of LiPF$_6$ dissolved therein and fluoroethylene carbonate and vinylethylene carbonate added thereto is used. Herein, the content of the fluoroethylene carbonate is about 6 parts by weight based on 100 parts by weight of the non-aqueous organic solvent of the ethylene carbonate, ethylmethyl carbonate, and vinylethylene carbonate, and the content of the vinylethylene carbonate is about 1 part by weight. Also, the mixing weight ratio of fluoroethylene carbonate to vinylethylene carbonate is about 6:1.

COMPARATIVE EXAMPLE 15

A rechargeable lithium battery cell is fabricated according to the same method as Comparative Example 14, except that a LiNi$_{0.5}$Mn$_{0.2}$CO$_{0.3}$O$_2$ positive active material is used as a positive active material.

COMPARATIVE EXAMPLE 16

A rechargeable lithium battery cell is fabricated by the same process as Comparative Example 14, except that a mixed solution of ethylene carbonate, ethylmethyl carbonate, and vinylethylene carbonate (about a 1:1:1 volume ratio) with about 1.15M of LiPF$_6$ dissolved therein and fluoroethylene carbonate, vinylethylene carbonate, and propane sultone added thereto is used as a non-aqueous electrolyte. Herein, the content of the fluoroethylene carbonate is about 3 parts by weight based on 100 parts by weight of the non-aqueous organic solvent of the ethylene carbonate, ethylmethyl carbonate, and vinylethylene carbonate, and the content of the vinylethylene carbonate is about 1 part by weight, while the content of the propane sultone is about 2 parts by weight. Also, the mixing weight ratio of fluoroethylene carbonate to vinylethylene carbonate is about 3:1.

EXAMPLE 7

A rechargeable lithium battery cell is fabricated by the same process as Comparative Example 16, except that the content of the fluoroethylene carbonate is changed to about 6 parts by weight based on 100 parts by weight of the non-aqueous organic solvent of ethylene carbonate, ethylmethyl carbonate, and vinylethylene carbonate, and a non-aqueous electrolyte containing fluoroethylene carbonate and vinylethylene carbonate in a mixing weight ratio of about 6:1 is used.

EXAMPLE 8

A rechargeable lithium battery cell is fabricated by the same process as Comparative Example 16, except that the content of the fluoroethylene carbonate is changed to about 9 parts by weight based on 100 parts by weight of the non-aqueous organic solvent of ethylene carbonate, ethylmethyl carbonate, and vinylethylene carbonate, and a non-aqueous electrolyte containing fluoroethylene carbonate and vinylethylene carbonate in a mixing weight ratio of about 9:1 is used.

EXAMPLE 9

A rechargeable lithium battery cell is fabricated by the same process as Comparative Example 16, except that the content of the fluoroethylene carbonate is changed to about 10 parts by weight based on 100 parts by weight of the non-aqueous organic solvent of ethylene carbonate, ethylmethyl carbonate, and vinylethylene carbonate, and a non-aqueous electrolyte containing fluoroethylene carbonate and vinylethylene carbonate in a mixing weight ratio of about 10:1 is used.

COMPARATIVE EXAMPLE 17

A rechargeable lithium battery cell is fabricated by the same process as Comparative Example 16, except that the content of the fluoroethylene carbonate is changed to about 11 parts by weight based on 100 parts by weight of the non-aqueous organic solvent of ethylene carbonate, ethylmethyl carbonate, and vinylethylene carbonate, and a non-aqueous electrolyte containing fluoroethylene carbonate and vinylethylene carbonate in a mixing weight ratio of about 1:1 is used.

The thickness expansion ratios and cycle life characteristics of the rechargeable lithium battery cells fabricated according to Examples 7 to 9 and Comparative Examples 14 to 17 were measured by the same method as used for Table 1, and the measurement results are presented in the following Table 2.

TABLE 2

| | Positive active material | First additive + second additive | Third additive | Thickness expansion ratio (%) | Cycle life (%) |
|---|---|---|---|---|---|
| Comparative Example 14 | LCO | FEC6 + VEC1 | — | 13 | 92 |
| Comparative Example 15 | NCM | FEC6 + VEC1 | — | 18 | 90 |
| Comparative Example 16 | NCM | FEC3 + VEC1 | PS2 | 11 | 79 |
| Example 7 | NCM | FEC6 + VEC1 | PS2 | 11 | 94 |
| Example 8 | NCM | FEC9 + VEC1 | PS2 | 14 | 92 |
| Example 9 | NCM | FEC10 + VEC1 | PS2 | 16 | 88 |
| Comparative Example 17 | NCM | FEC11 + VEC1 | PS2 | 19 | 84 |

As shown in Table 2, the thickness expansion ratios of the rechargeable lithium battery cells fabricated according to Examples 7 to 9 are as low as about 11 to about 16%. Also, they have excellent cycle life characteristics ranging from about 88 to about 94%.

In the case of the rechargeable lithium battery cell fabricated according to Comparative Example 14 using $LiCoO_2$ as a positive active material, the thickness expansion ratio was low and the cycle life characteristic was excellent (or favorable). However, the rechargeable lithium battery cell fabricated according to Comparative Example 15 using $LiNi_{0.5}Mn_{0.2}CO_{0.3}O_2$ had an increased thickness expansion ratio and a deteriorated cycle life characteristic.

Also, in the case of the rechargeable lithium battery cell fabricated according to Comparative Example 16 using a small amount of alkane sultone along with fluoroethylene carbonate and vinylethylene carbonate in the electrolyte, the cycle life was deteriorated. The rechargeable lithium battery cell fabricated according to Comparative Example 17 using a large amount of alkane sultone along with fluoroethylene carbonate and vinylethylene carbonate in the electrolyte, had a deteriorated cycle life characteristic and/or an increased thickness expansion ratio.

It may be seen from the results of Table 2 a satisfactory thickness expansion ratio, low temperature discharge characteristic, and cycle life characteristic may be obtained by adding the fluoroethylene carbonate, vinylethylene carbonate, and alkane sultone additives to the non-aqueous electrolyte, and by varying the mixing ratio in accordance with the cell thickness.

While this disclosure has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof. Therefore, the aforementioned embodiments should be understood to be exemplary but not limiting this disclosure in any way.

What is claimed is:
1. A prismatic rechargeable lithium battery comprising:
a positive electrode comprising a nickel-based positive active material;
a negative electrode comprising a negative active material; and
an electrolyte comprising a non-aqueous organic solvent, a lithium salt, a first fluoroethylene carbonate additive, a second vinylethylene carbonate additive, and a third alkane sultone additive, the third alkane sultone additive comprising a C3 to C4 alkane sultone, wherein when the battery is equal to or thicker than 5 mm, a mixing weight ratio of the first fluoroethylene carbonate additive to the second vinylethylene carbonate additive ranges from about 5:1 to about 10:1, and when the battery is thinner than 5 mm, the mixing weight ratio of the first fluoroethylene carbonate additive to the second vinylethylene carbonate additive ranges from about 1:1 to about 4:1.

2. The prismatic rechargeable lithium battery of claim 1, wherein when the battery is equal to or thicker than 5 mm, the mixing weight ratio of the first fluoroethylene carbonate additive and the second vinylethylene carbonate additive ranges from about 6:1 to about 7:1, and when the battery is thinner than 5 mm, the mixing weight ratio of the first fluoroethylene carbonate additive and the second vinylethylene carbonate additive ranges from about 3:1 to about 4:1.

3. The prismatic rechargeable lithium battery of claim 1, wherein the positive active material is represented by the following Chemical Formula 1:

$$Li_xMO_{2-z}L_z \qquad \text{Chemical Formula 1}$$

wherein, M is $M'_{1-k}A_k$; M' is $Ni_{1-a-b}Mn_aCo_b$; A is a dopant comprising an element selected from the group consisting of B, Ca, Zr, S, F, P, Bi, Al, Mg, Zn, Sr, Cu, Fe, Ga, In, Cr, Ge, and Sn, where $0.65 \leq a+b \; 0.85$, $0.1 \leq b \leq 0.4$, and $0 \leq k < 0.050$; and L is selected from the group consisting of F, S, P, and combinations thereof, where, $0.95 \leq x \leq 1.05$, and $0 \leq z \leq 2$.

4. The prismatic rechargeable lithium battery of claim 1, wherein the alkane sultone comprises a material selected from the group consisting of propane sultone, butane sultone, and mixtures thereof.

5. The prismatic rechargeable lithium battery of claim 1, wherein the third alkane sultone additive ranges from about 0.1 to about 5 parts by weight based on 100 parts by weight of the non-aqueous organic solvent.

6. The prismatic rechargeable lithium battery of claim 1, wherein the first fluoroethylene carbonate additive ranges from about 0.1 to about 10 parts by weight based on 100 parts by weight of the non-aqueous organic solvent.

7. The prismatic rechargeable lithium battery of claim 1, wherein the second vinylethylene carbonate additive ranges from about 0.1 to about 10 parts by weight based on 100 parts by weight of the non-aqueous organic solvent.

* * * * *